US 8,756,649 B2

(12) United States Patent
Kaminsky et al.

(10) Patent No.: US 8,756,649 B2
(45) Date of Patent: Jun. 17, 2014

(54) LANGUAGE-AGNOSTIC POLICY MANAGEMENT

(75) Inventors: David L. Kaminsky, Chapel Hill, NC (US); Indrajit Poddar, Sewickley, PA (US); Neeraj Joshi, Morrisville, NC (US); A. Steven Krantz, Sherman Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 11/838,432

(22) Filed: Aug. 14, 2007

(65) Prior Publication Data
US 2009/0049508 A1 Feb. 19, 2009

(51) Int. Cl.
*G06F 17/00* (2006.01)
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | | |
|---|---|---|---|---|
| 6,519,679 | B2 * | 2/2003 | Devireddy et al. | 711/114 |
| 2003/0110192 | A1 * | 6/2003 | Valente et al. | 707/513 |
| 2007/0150936 | A1 * | 6/2007 | Maes | 726/1 |
| 2007/0156727 | A1 * | 7/2007 | Lim | 707/100 |
| 2007/0162749 | A1 * | 7/2007 | Lim | 713/167 |
| 2007/0239648 | A1 * | 10/2007 | Thota | 706/47 |
| 2008/0013724 | A1 * | 1/2008 | Shamoon et al. | 380/201 |
| 2008/0256593 | A1 * | 10/2008 | Vinberg et al. | 726/1 |
| 2010/0131104 | A1 * | 5/2010 | Brown et al. | 700/275 |

OTHER PUBLICATIONS

Why Does Vista Use All My Memory? by Jeff Atwood Sep. 22, 2006.*

* cited by examiner

*Primary Examiner* — Kambiz Zand
*Assistant Examiner* — Benjamin Kaplan
(74) *Attorney, Agent, or Firm* — Moore & Van Allen PLLC

(57) ABSTRACT

A system and method for language-agnostic policy management. At least one policy associated with an event occurrence is identified. At least one policy engine associated with the at least one policy is identified. The at least one policy is evaluated by a policy engine of the associated at least one policy engine.

23 Claims, 3 Drawing Sheets

LANGUAGE-AGNOSTIC POLICY MANAGEMENT

BACKGROUND OF THE INVENTION

The present invention is related to policy management, and more specifically to language-agnostic policy management.

A policy may be a set of considerations or rules designed to guide decisions or courses of actions. In general, policies may be in any format and may be written policies, spoken policies, or machine-executable policies. Machine-executable policies may be written in any of many different languages such as, for example, Access Control Mark-up Language (XACML), Common Information Model Simplified Policy Language (CIM-SPL), EWLM's policy language, (Enterprise Work Load Manager), etc.

Regarding machine-executable policies, there are many domain-specific policy languages. Currently, because of language inconsistencies, these policies have been managed separately. For example, a system or enterprise may have a number of access control policies written in XACML, executed by Automatic Routine Generating and Updating System (ARGUS) engine, and have other policies that are, e.g., networking policies conforming to Distributive Management Task Force (DMTF) standards and managed separately, etc. This disparity of language and execution engine inconsistencies complicates management and automation of the policies.

BRIEF SUMMARY OF THE INVENTION

According to one aspect of the present invention, a method for language-agnostic policy management includes identifying at least one policy associated with an event occurrence, identifying at least one policy engine associated with the at least one policy, and evaluating the at least one policy by a policy engine of the associated at least one policy engine.

According to another aspect of the present invention, a meta-engine includes a policy identification module, the policy identification module identifying at least one policy associated with an event occurrence, and an engine identification module, the engine identification module identifying at least one policy engine associated with the at least one policy.

According to a further aspect of the present invention, a computer program product comprising a computer useable medium having computer useable program code embodied therewith, the computer useable program code comprising computer useable program code configured to identify at least one policy associated with an event occurrence, computer useable program code configured to identify at least one policy engine associated with the at least one policy, and computer useable program code configured to evaluate the at least one policy by a policy engine of the associated at least one policy engine.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
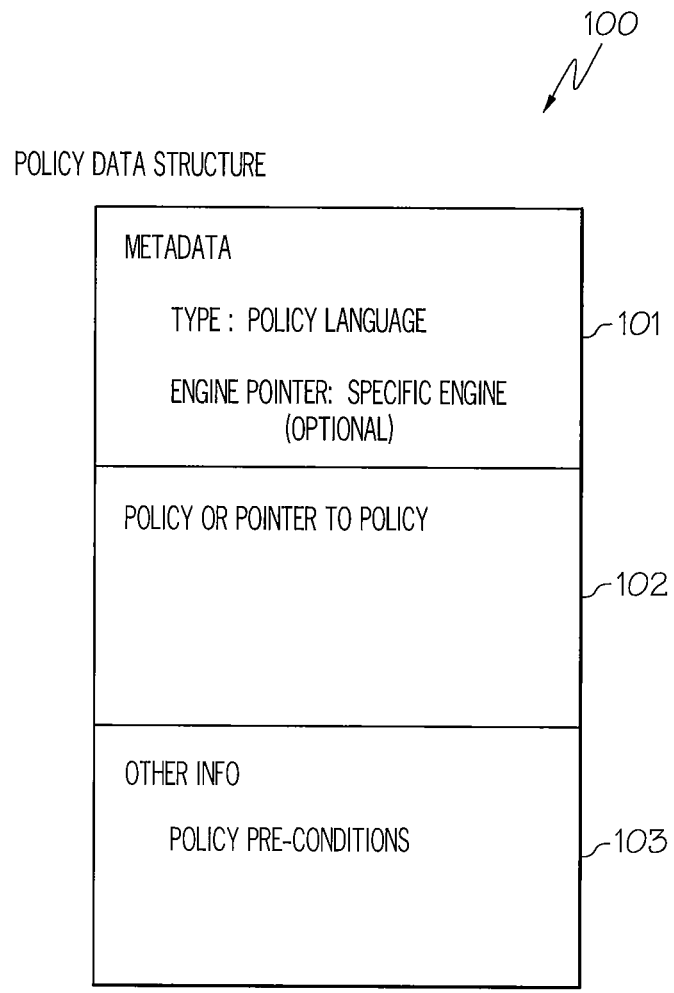
FIG. 1 shows a diagram of a policy data structure according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention are related to a language agnostic system for policy management. Policies in a system or enterprise are managed even though the policies may be written in a variety of different languages. Policies according to embodiments of the present invention may be stored as part of a larger data structure that also includes a type indicator indicating the language of the policy, the policy or pointer to the policy, and a pointer to one or more execution engines (policy engine) capable of executing/evaluating the language of the policy. In another embodiment of the present invention, an external table may map type indicators to preferred execution engines. The policy itself is obscured from the policy management.

According to embodiments of the present invention, a policy meta-engine may retrieve policies and determine which policy engine to call for evaluation/execution of the policy, and then send the policy to that policy engine for evaluation. The meta-engine may pass the actual policy data (i.e., by value) or may pass a pointer to the policy data (i.e., by reference) to the particular policy engine for evaluation. The policy engine may evaluate or execute the policy and based on the evaluation may provide a value result (e.g., true, false, permit, deny, etc.) or an action result (e.g., initiate action, no action, etc.).

FIG. 1 shows a diagram of a policy data structure according to an example embodiment of the present invention. The policy data structure 100 may include various portions such as, for example, a metadata portion 101, a portion containing the policy or pointer to the policy 102, and other portions 103 that may include other information such as policy pre-conditions. The policy pre-conditions may alternatively be in the metadata portion 101. The metadata portion 101 may also include a policy type indicator that specifies a language in which the policy is written.

Further, the metadata portion 101 may include an engine pointer that points to a specific policy engine that is desired to be used for policies written in the language indicated in the type indicator. There may be multiple policy engines that may be capable of evaluating policies written in the particular policy language specified in the policy type indicator, however, it may be desired to designate a specific one of these policy engines for evaluating policies written in the specified language. Further, although not shown, the policy data structure may include other information such as, for example, a short description (e.g., title, note, etc.) of the policy, evaluation events that trigger policy evaluation, standard metadata such as, for example, author, approval, change history, etc., or other data as needed. The policy pre-conditions may be evaluation conditions (additional conditions) that constrain when the policy is evaluated. For example, a policy pre-condition may include "only active during business hours." In this regard, a policy may not be evaluated or executed if an event triggers an evaluation of the policy, but the event occurs outside of business hours.

Figure 2:
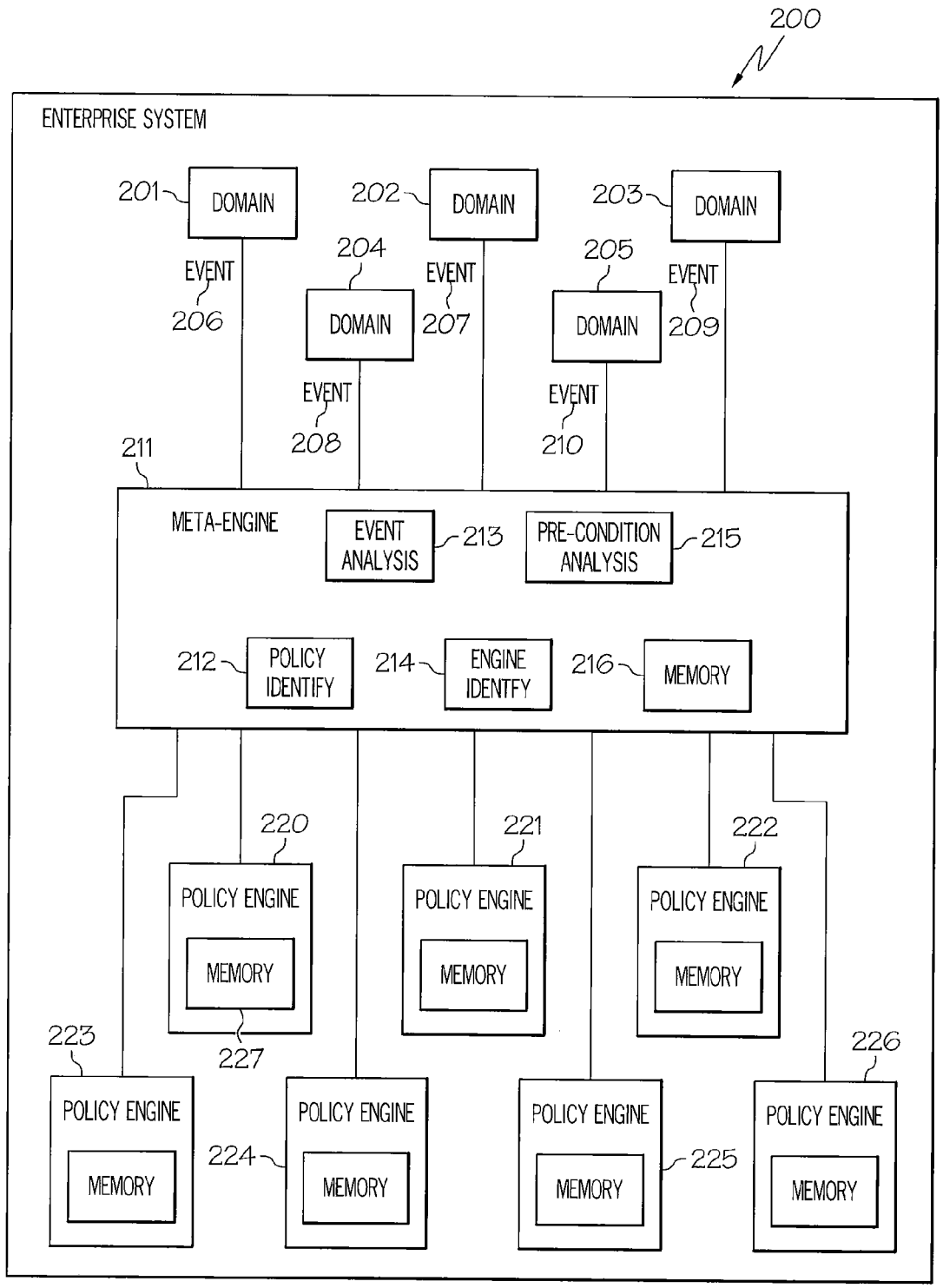
FIG. 2 shows a diagram of a system for language-agnostic policy management according to an example embodiment of the present invention.

FIG. 2 shows a diagram of a system for language-agnostic policy management according to an example embodiment of the present invention. The system 200 may include one or more domains 201-205, a meta-engine 211, and one or more policy engines 220-226. Each of the domains 201-205 may represent a part of the system in which the data processing resources may be under a common control or may be related in some manner. The operations and functions within a particular domain 201-205 may be supported by a set of policies. Further, there may be policies that are more general in nature and support multiple domains 201-205. Each domain may have one or more evaluation events 206-210 that may occur and that may trigger an associated policy evaluation. In response to the occurrence of an evaluation event 206-210, the event may be analyzed to determine what associated policy may be needed for evaluation and the associated policy evaluated by an appropriate policy engine.

Moreover, according to embodiments of the present invention, a policy meta-engine 211, may include various modules for performing various functions. These modules may be implemented in software, hardware, or a combination thereof. For example, a policy meta-engine 211 may include a policy identification module 212, an event analysis module 213, an engine identification module 214, a pre-condition analysis module 215, and memory or storage for storing policies and other information 216. A policy identification module 212 of the meta-engine 211 may identify one or more policies associated with an event occurrence. Further, an event analysis module 213 may detect the occurrence of an event in one or more domains 201-205. The engine identification module 214 of the meta-engine 211 may identify one or more policy engines associated with the policy that may need to be evaluated based on the occurrence of the event.

Moreover, the pre-condition analysis module 215 may determine if there are any pre-conditions in a policy data structure associated with a policy. These pre-conditions may need to be satisfied or (less typically) not satisfied before a policy is evaluated or not. Once an appropriate policy engine 220-226 has been identified, the meta-engine 211 may then send the policy, and possibly information related to the event 206-210 occurrence, to the appropriate policy engine 220-226 for evaluation/execution. The meta-engine 211 may determine whether the policy engine 220-226 already has the desired policy stored in its memory 227. Each of the policy engines 220-226 may include a memory 227 for storing policies and/or other information. If the policy engine 220-226 required for evaluation of the policy already has the policy stored, the meta-engine 211 may not need to send the policy to the policy engine 220-226.

Figure 3:
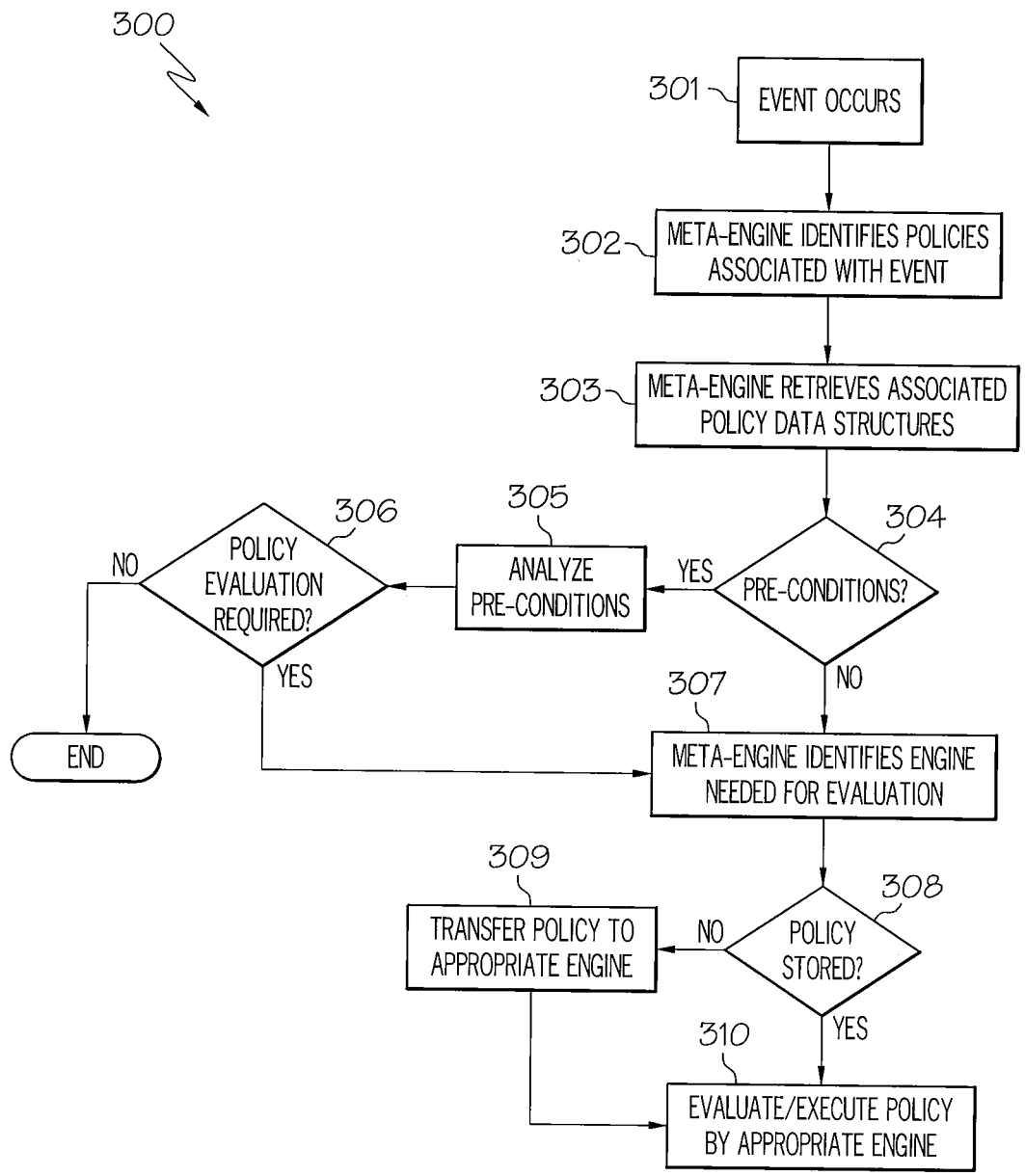
FIG. 3 shows a flowchart of a process for language-agnostic policy management according to an example embodiment of the present invention.

FIG. 3 shows a flowchart of a process for language-agnostic policy management according to an example embodiment of the present invention. In the process 300, in block 301, it may be determined if an event has occurred. In block 302, the policy meta-engine may identify policies associated with the event occurrence. In block 303, the policy meta-engine may retrieve the associated policy data structures (associated with the identified policies). In block 304, the meta-engine may determine if there are any pre-conditions related to the policy. If there are pre-conditions, then in block 305, the pre-conditions may be analyzed, and it determined in block 306 if policy evaluation is required. If no policy evaluation is required, the process ends. If there are no pre-conditions, or if policy evaluation is required based on the analysis of the pre-conditions, in block 307, the meta-engine may identify the policy engine needed for evaluation/execution of the policy.

In block 308, the meta-engine may determine if the policy engine needed for evaluation already has the policy stored and, if so, may merely send information related to the event occurrence to the policy engine, and in block 310, the policy engine may evaluate/execute the policy. If the policy is not stored at the policy engine, in block 309, the meta-engine may transfer the policy to the appropriate policy engine. According to embodiments of the present invention, policies in various languages are easily managed since policies may be managed together by use of the meta-engine independent of the language in which the policy is written.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for language-agnostic policy management comprising:

identifying, by a meta-engine on a computer at least one policy associated with an event occurrence, wherein the meta-engine comprises a memory for storing policies of different languages, the policies being managed together by the meta-engine independent of the language in which each of the policies is written;

identifying, by the meta-engine a specific policy engine capable of evaluating the at least one policy from a plurality of policy engines, based on a respective policy data structure associated with each of the plurality of policy engines, the respective policy data structure associated with the specific policy engine comprises a metadata portion, the metadata portion comprising an engine pointer that points to the specific policy engine; and evaluating the at least one policy by the specific policy engine.

2. The method according to claim 1, further comprising the at least one policy being part of the associated policy data structure, the policy data structure comprising a policy type indicator specifying a language of the policy.

3. The method according to claim 2, wherein each associated policy data structure comprises a reference to a policy engine, the policy engine being capable of evaluating the policy based on the language of the policy.

4. The method according to claim 2, further comprising evaluating preconditions associated with each policy in each associated policy data structure.

5. The method according to claim 1, further comprising identifying the specific policy engine associated with the at least one policy by the meta-engine based on the policy language.

6. The method according to claim 1, further comprising:
determining by the meta-engine if the specific policy engine for evaluating the at least one policy has already stored the at least one policy; and
transferring the at least one policy to the specific policy engine in response to the specific policy engine not having already stored the at least one policy.

7. The method according to claim 1, further comprising storing the at least one policy on a memory of the specific policy engine associated with the at least one policy.

8. The method of claim 1, wherein identifying the specific policy engine by the meta-engine comprises:
analyzing the event occurrence by an event analysis module in the meta-engine;
determining, by a pre-condition module in the meta-engine, if the policy data structure of the at least one policy comprises a policy pre-condition; and
evaluating the policy pre-condition by the pre-condition module before identifying the specific policy engine capable of evaluating the at least one policy and evaluating the at least one policy by the specific policy engine in response to the policy data structure comprising the policy pre-condition.

9. The method of claim 8, wherein the policy pre-condition comprises a constraint when the at least one policy can be evaluated by the specific policy engine.

10. The method of claim 1, wherein the metadata portion comprises a policy type indicator that specifies a particular language in which the at least one policy is written, the engine pointer points to the specific policy engine, that is to be used for evaluating the at least one policy, of the plurality of policy engines capable of evaluating the particular language.

11. The method of claim 10, wherein the respective policy data structure further comprises:
another portion comprising one of the policy portion or a pointer to the policy; and a further portion comprising a policy pre-condition, the policy pre-condition being analyzed before the meta-engine identifies the specific engine capable of evaluating the at least one policy.

12. A meta-engine comprising:
a computer useable medium device;
a policy identification module embodied in the computer useable medium device, the policy identification module identifying at least one policy associated with an event occurrence;
an engine identification module, the engine identification module identifying a specific policy engine capable of evaluating the at least one policy from a plurality of policy engines, based on a respective policy data structure associated with each of the plurality of policy engines, the respective policy data structure associated with the specific policy engine comprises a metadata portion, the metadata portion comprising an engine pointer that points to the specific policy engine; and
a memory for storing policies of different languages, the policies being managed together by the meta-engine independent of the language in which each of the policies is written.

13. The meta-engine according to claim 12, further comprising an event analysis module, the event analysis module detecting the occurrence of an event.

14. The meta-engine according to claim 12, further comprising a precondition analysis module, the pre-condition analysis module analyzing preconditions associated with each policy in an associated policy data structure before identifying the specific policy engine capable of evaluating the at least one policy.

15. The meta-engine according to claim 12, wherein the at least one policy is part of the associated policy data structure, the policy data structure comprising a policy type indicator specifying a language of the policy.

16. The meta-engine according to claim 15, wherein each associated policy data structure comprises a reference to a policy engine, the policy engine being capable of evaluating the policy based on the language of the policy.

17. The meta-engine according to claim 12, wherein the engine identification module identifies the specific policy engine associated with the at least one policy based on the policy language.

18. The meta-engine according to claim 12, wherein the engine identification module transfers the at least one policy to the identified specific policy engine for evaluation.

19. The meta-engine according to claim 12, wherein the specific policy engine comprises a memory for storing the at least one policy associated with the specific policy engine, the meta-engine transfers the at least one policy to the specific policy engine associated with the at least one policy in response to the at least one policy not be stored by the memory of the specific policy engine.

20. A computer program product comprising a computer useable storage medium having computer useable program code embodied therewith, the computer useable program code comprising:
computer useable program code configured to identify at least one policy, by a meta-engine, associated with an event occurrence, wherein the meta-engine comprises a memory for storing policies of different languages, the policies being managed together by the meta-engine independent of the language in which each of the policies is written;
computer useable program code configured to identify a specific policy engine associated with the at least one policy from a plurality of policy engines, based on a respective policy data structure associated with each of the plurality of policy engines, the respective policy data structure associated with the specific policy engine comprises a metadata portion, the metadata portion comprising an engine pointer that points to the specific policy engine; and
computer useable program code configured to evaluate the at least one policy by the specific policy engine.

21. The computer program product according to claim 20, further comprising the at least one policy being part of the associated policy data structure, the policy data structure comprising a policy type indicator specifying a language of the policy.

22. The computer program product according to claim 21, wherein each associated policy data structure comprises a reference to a policy engine, the policy engine being capable of evaluating the policy based on the language of the policy.

23. The computer program product according to claim 21, further comprising computer useable program code configured to evaluate pre-conditions associated with each policy in each associated policy data structure.

* * * * *